United States Patent
Fang et al.

(10) Patent No.: US 12,061,277 B1
(45) Date of Patent: Aug. 13, 2024

(54) AIRBORNE POSITIONING METHOD IN AVIATION NAVIGATION NETWORK BASED ON MULTI-SOURCE INFORMATION FUSION

(71) Applicant: Beihang University, Beijing (CN)

(72) Inventors: Kun Fang, Beijing (CN); Zhipeng Wang, Beijing (CN); Xiaopeng Hou, Beijing (CN); Zhiqiang Dan, Beijing (CN); Jinqi Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/383,524

(22) Filed: Oct. 25, 2023

(30) Foreign Application Priority Data

Aug. 10, 2023 (CN) .......................... 202311002702.9

(51) Int. Cl.
*G01S 19/47* (2010.01)
*G01S 5/02* (2010.01)
*G01S 19/49* (2010.01)

(52) U.S. Cl.
CPC ............ *G01S 19/47* (2013.01); *G01S 5/0264* (2020.05); *G01S 5/0244* (2020.05); *G01S 5/0294* (2013.01); *G01S 19/49* (2013.01); *G01S 2205/03* (2020.05)

(58) Field of Classification Search
CPC .......... G01S 19/45; G01S 19/47; G01S 19/48; G01S 19/49; G01S 5/0264; G01S 5/0244; G01S 5/0294
USPC ....... 342/454, 357.28, 357.3, 357.31, 357.32
See application file for complete search history.

(56) References Cited

U.S. PATENT DOCUMENTS

| | | | |
|---|---|---|---|
| 8,577,607 B2 * | 11/2013 | Williamson ......... | G01C 21/188 342/357.49 |
| 9,593,963 B2 * | 3/2017 | Guillet ................. | G08G 5/0021 |
| 10,422,872 B2 * | 9/2019 | Dunik .................... | G01S 13/86 |
| 11,747,482 B2 * | 9/2023 | Wang .................... | G01S 19/396 342/352 |
| 11,789,163 B2 * | 10/2023 | Dong .................... | G01S 19/393 342/357.3 |

FOREIGN PATENT DOCUMENTS

| | | | | |
|---|---|---|---|---|
| CN | 113916222 A | * | 1/2022 | ............. G01C 21/16 |
| WO | WO-2012123545 A1 | * | 9/2012 | ............. G01C 21/20 |

* cited by examiner

*Primary Examiner* — Chuong P Nguyen
(74) *Attorney, Agent, or Firm* — Locke Lord LLP; Tim Tingkang Xia, Esq.

(57) ABSTRACT

The present application discloses an airborne positioning method and system for an aviation navigation network, and relates to the technical field of satellite navigation. The airborne positioning method for an aviation navigation network is applied to an omnisource navigation system, and comprises the following steps: acquiring the original observation data of the omnisource navigation system; Filtering the original observation data based on dead reckoning to obtain filtered observation data; Unify that filtered observation data in time and space to obtain observation data to be fused; The adaptive fusion algorithm of omnisource navigation based on variance optimization is adopted to fuse the observation data to be fused to obtain the fused data; the fused data is used to characterize the position of the target aircraft at the current moment. The present application can improve the accuracy of the positioning result.

8 Claims, 2 Drawing Sheets

AIRBORNE POSITIONING METHOD IN AVIATION NAVIGATION NETWORK BASED ON MULTI-SOURCE INFORMATION FUSION

CROSS-REFERENCE TO RELATED APPLICATION

This non-provisional application claims priority under 35 U.S.C. § 119(a) to Patent Application No. CN202311002702.9 filed in China, P.R.C. on Aug. 10, 2023, the entire contents of which are hereby incorporated by reference.

TECHNICAL FIELD

The present application relates to the technical field of satellite navigation, in particular to an airborne positioning method and system for an aviation navigation network.

BACKGROUND

With the continuous development of aviation technology, aviation navigation and positioning technology plays an increasingly important role in achieving high precision and high reliability. At present, the Global Navigation Satellite System (GNSS) has become the main provider of high-precision positioning information for aviation navigation. However, the fragility of GNSS makes the system vulnerable to natural or artificial interference and deception, thus failing to provide effective position, navigation and time (PNT) services in some cases, leading to navigation risks and safety problems. Therefore, the international civil aviation organization (ICAO) has made it clear in the global air navigation plan that the future development trend of air navigation is a modern air navigation system with GNSS and its augmentation system as the backbone and land-based navigation system as the backup. By adopting the aviation navigation and positioning technology based on omnisource information fusion, we can overcome the shortcomings of GNSS, ensure the safe operation of aircraft in the whole navigation phase, and support performance-based navigation (PBN).

In recent years, with the continuous development of multi-source information fusion technology and aviation navigation network technology, airborne positioning technology has also been greatly improved and upgraded. Among them, the airborne positioning technology of aviation navigation network based on omnisource information fusion is an important technology, which uses various sensors, communication equipment, ground facilities and other multi-source information to achieve high-precision and high-reliability airborne positioning through data fusion and information exchange. Compared with the traditional combination technology of GPS and INS, the airborne positioning technology based on omnisource information fusion has higher accuracy and stronger robustness, and is suitable for various aviation application fields. However, there are still some problems and challenges in this technology, such as the complexity of information processing and transmission, the collaborative processing of different sensor data and so on, so it needs more in-depth research and improvement.

In order to overcome the vulnerability of GNSS, one method is to study anti-jamming technology, and to remove stray signals by configuring a filter at the front end of the receiver. Some scholars put forward the strategy of calculating the optimal transform order based on fractional Fourier transform. This strategy can effectively suppress LFM interference in GNSS receiver. In addition, a multi-module cascade filter based on adaptive filtering technology can be designed to detect and suppress various continuous wave interferences. However, the efficiency of these technologies depends on the nature of interference sources. The interference of continuous wave can be eliminated by filter, but the interference of linear modulation is difficult to remove.

Another method is to study the alternative system of GNSS (APNT). That is, to provide backup capability for PNT in case of GNSS loss. Existing traditional navigation and surveillance infrastructure, such as Very-high-frequency Omnidirectional Range (VOR), distance measuring equipment (DME), Non-Directional Beacon (NDB) and Secondary Surveillance Radar (SSR), and single navigation system such as ILS and L-band digital aeronautical communication system (LDACS) may not reach the performance level required by PBN. As a land-based radio navigation and positioning system completely independent of GNSS, the e-Loran system currently under study can greatly reduce the negative impact of interference caused by GNSS failure or interruption on safety and economy. Loran provides independent positioning and navigation timing functions, but its failure mode is different from GNSS, and its coverage is limited. As an autonomous navigation system, inertial navigation system can be combined with GNSS to solve the problems of signal loss and cycle slip in the positioning process of GNSS. However, inertial navigation system can only be used for a period of time limited by drift rate. The aviation navigation and positioning technology based on omnisource information fusion can overcome the shortcomings of a single system and improve the signal coverage and reliability by fusing the information of multiple navigation systems. At the same time, it can also effectively overcome the error caused by signal interference. Generally speaking, the aviation navigation and positioning technology based on omnisource information fusion has high research and application value and is one of the development directions of aviation navigation and positioning technology in the future.

At present, the low availability of land-based navigation sources is a key challenge in providing complete alternative positioning, navigation and timing (APNT) services for civil aviation due to the increasing volume of civil aviation business and air-ground data. In order to realize the location technology of omnisource navigation information fusion, there are still the following problems: the first is the optimization and selection of omnisource navigation system. Due to the heterogeneous positioning mechanism and different scope of action of different omnisource navigation systems, it is necessary to consider the optimal selection of different navigation sources in the whole flight stage. The second is the algorithm design of omnisource information fusion positioning. Because different navigation source information is mainly divided into two ways: ranging and direction finding, how to make full use of these navigation source information to achieve better positioning effect is the core problem of omnisource information fusion positioning algorithm. In practical application, the motion state of the carrier is complex, and it is difficult to establish an accurate system dynamics model. In addition, the observation data are influenced by different factors, so it is difficult to establish an accurate mathematical model to simulate the statistical characteristics. If the Kalman filter parameters cannot be adjusted in time, it may lead to the accumulation of errors in the filtering results, thus reducing the positioning accuracy. Therefore, it is necessary to adaptively filter the data to reduce the influence of the above problems on the fusion results.

As for the first problem, the existing technology has the defects of fixed combination form of omnisource navigation sources, single operation mode, and no systematic analysis of possible differences in technical standards and data formats between different navigation sources. As for the second question, scholars put forward different navigation source combination systems to improve the usability of navigation systems and ensure the quality of PNT information. However, the existing fusion technology may have some defects, such as failure of a navigation source or inaccurate data, inability to monitor the corresponding failure and corresponding fault-tolerant processing.

SUMMARY

The present application aims to provide an airborne positioning method and system for an aviation navigation network, so as to improve the accuracy of positioning results.

In order to achieve the above object, the present application provides the following solution:

The present application relates to an airborne positioning method for an aviation navigation network, which is applied to an omnisource navigation system; the navigation sources of the omnisource navigation system include a satellite-based navigation system, a land-based navigation system, an inertial navigation system and a new generation aviation communication system, and when a target aircraft is in different flight stages, different navigation sources are combined for positioning; the airborne positioning method for an aviation navigation network comprises the following steps:

acquiring original observation data of the omnisource navigation system;

filtering the original observation data based on dead reckoning to obtain filtered observation data;

unifying the filtered observation data in time and space to obtain observation data to be fused;

fusing the observation data to be fused by adopting an adaptive fusion algorithm of omnisource navigation based on variance optimization to obtain fused data; wherein the fused data is used to characterize a position of the target aircraft at a current moment.

Optionally, the step of fusing the observation data to be fused by adopting an adaptive fusion algorithm of omnisource navigation based on variance optimization to obtain fused data specifically comprises:

adaptively adjusting a measurement noise at a last moment according to a navigation source fusion factor at the last moment; wherein the navigation source fusion factor at the last moment is determined according to an error covariance matrix of a predicted state at the last moment;

determining a Kalman filtering gain at the last moment according to the measurement noise at the last moment, the predicted state at the last moment and the error covariance matrix of the predicted state at the last moment;

determining an estimated state of the last moment according to the Kalman filter gain, the predicted state and the measured value of the last moment;

determining an error covariance matrix of the estimated state at the last moment according to the Kalman filter gain at the last moment, the predicted state at the last moment and the error covariance matrix of the predicted state at the last moment;

determining a predicted state of a current moment according to a state transition matrix of the last moment and the estimated state of the last moment;

determining an error covariance matrix of the predicted state at the current moment according to the state transition matrix at the last moment and the error covariance matrix of the estimated state at the last moment;

determining the fused data at the current moment according to the error covariance matrix of the predicted state at the current moment and the observation data to be fused at the current moment.

Optionally, the step of determining the fused data at the current moment according to the error covariance matrix of the predicted state at the current moment and the observation data to be fused at the current moment specifically comprising:

determining a navigation source fusion factor at the current moment according to the error covariance matrix of the predicted state at the current moment by adopting a variance optimization method;

determining the fused data at the current moment according to the navigation source fusion factor at the current moment and the observation data to be fused at the current moment.

Optionally, a calculation formula of the navigation source fusion factor is:

$$\omega_i = \frac{1}{\sigma_i^2 \sum_{j=1}^{n} \frac{1}{\sigma_j^2}};$$

where, $\omega_i$ is the fusion factor of an $i^{th}$ navigation source, n is a total number of navigation sources, $\sigma_i^2$, is the variance of the $i^{th}$ navigation source in the error covariance matrix of the predicted state, $\sigma_j^2$ is the variance of the $j^{th}$ navigation source in the error covariance matrix of the predicted state, and i and j are both the serial numbers of the navigation sources.

Optionally, a calculation formula of the fused data at the current moment is:

$$\text{output} = \sum_{i=1}^{n} \frac{y_i}{\hat{\sigma}_i^2 \sum_{j=1}^{n} \frac{1}{\sigma_j^2}};$$

where, output is the fused data, $y_i$ is the observation data of the $i^{th}$ navigation source in the observation data to be fused, and $\hat{\sigma}_i^2$ is the estimated value of the variance of the $i^{th}$ navigation source in the error covariance matrix of the predicted state.

Optionally, the airborne positioning method for an aviation navigation network further comprises:

monitoring the data integrity of the fused data to obtain a monitoring result; using the monitoring result to optimize the step of filtering the original observation data based on dead reckoning to obtain filtered observation data and unifying the filtered observation data in time and space to obtain observation data to be fused.

A airborne positioning system for an aviation navigation network is applied to an omnisource navigation system;

navigation sources of the omnisource navigation system comprise a satellite-based navigation system, a land-based navigation system, an inertial navigation system and a new generation aviation communication system, and when a target aircraft is in different flight stages, different navigation sources are combined for positioning; the airborne positioning system for an aviation navigation network comprises:

a data acquisition module configured for acquiring original observation data of the omnisource navigation system;
  a preprocessing module configured for:
  filtering the original observation data based on dead reckoning to obtain filtered observation data;
  unifying the filtered observation data in time and space to obtain observation data to be fused;
  a main processing module configured for:
  fusing the observation data to be fused by adopting an adaptive fusion algorithm of omnisource navigation based on variance optimization to obtain fused data;
    wherein the fused data is used to characterize a position of the target aircraft at a current moment.

Optionally, the airborne positioning system for an aviation navigation network further comprises:

a post-processing module is configured for monitoring the data integrity of the fused data to obtain a monitoring result; using the monitoring result to optimize the step of filtering the original observation data based on dead reckoning to obtain filtered observation data and unifying the filtered observation data in time and space to obtain observation data to be fused.

According to the specific embodiment provided by the present application, the present application discloses the following technical effects:

The airborne positioning method for an aviation navigation network provided by the present application is applied to an omnisource source navigation system, which integrates a plurality of navigation sources including a satellite-based navigation system, a land-based navigation system, an inertial navigation system and a new generation aviation communication system, and when the target aircraft is in different flight stages, positioning is carried out by combining different navigation sources, which can provide more flexibility and adaptability to adapt to different navigation scenarios and requirements. In addition, in the present application, the observation data to be fused are fused by adopting the adaptive fusion algorithm of omnisource source navigation based on variance optimization to obtain fused data, so that a more accurate positioning solution can be obtained by using the omnisource source information fusion positioning method when the navigation system is unavailable due to natural or artificial interference, and at the same time, the reliability, robustness and other performances of the positioning system are enhanced.

BRIEF DESCRIPTION OF DRAWINGS

In order to explain the embodiments of the present application or the technical solution in the prior art more clearly, the drawings needed in the embodiments will be briefly introduced below. Obviously, the drawings described below are only some embodiments of the present application, and other drawings can be obtained according to these drawings without creative work for ordinary people in the field.

DESCRIPTION OF EMBODIMENTS

In the following, the technical solution in the embodiment of the present application will be clearly and completely described with reference to the attached drawings. Obviously, the described embodiment is only a part of the embodiment of the present application, but not the whole embodiment. Based on the embodiments in the present application, all other embodiments obtained by those skilled in the art without creative labor belong to the scope of protection of the present application.

The present application aims to provide an airborne positioning method and system for an aviation navigation network, so as to improve the accuracy of positioning results.

In order to make the above objects, features and advantages of the present application more obvious and easy to understand, the present application will be further described in detail with the attached drawings and specific embodiments.

Example 1

The embodiment of the present application provides an airborne positioning method for an aviation navigation network, which is applied to an omnisource navigation system.

In civil aviation, so far, VOR and DME are the core, and three different combined systems are used to support air route flight, namely VOR/VOR, VOR/DME and DME/DME. At present, there are many VOR/VOR and VOR/DME systems used for navigation of civil aviation routes. For the existing land-based navigation system, VOR will continue to be used to support the operation of terminals and routes, and keep the necessary VOR as a backup means of GNSS. DME is used to support the operation of terminal and route PBN, and ILS and GBAS are used for precision approach. For the cruise phase, technologies such as Global Navigation Satellite System (GNSS) or Inertial Navigation System (INS) can be used. At the same time, the two-way ranging of L-band digital aeronautical communication system (LDACS) also gives a new positioning method. In order to improve the performance and reliability of the whole navigation system, we should make full use of the advantages of different navigation systems in all stages of flight, including take-off, cruise, descent and landing. Therefore, the present application provides an omnisource integrated system architecture based on different flight stages.

Figure 1:
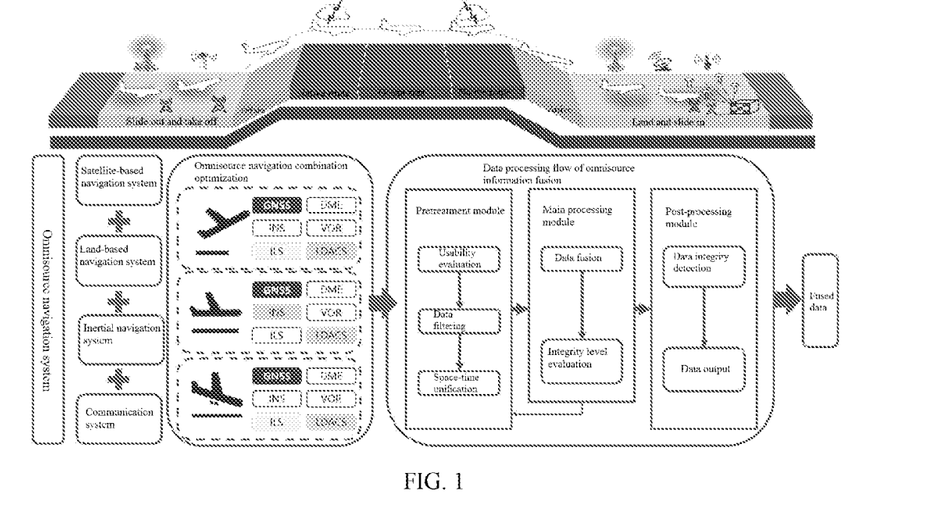
FIG. 1 is an architecture diagram of an omnisource integrated system based on different flight stages provided by the present application.

FIG. 1 is an architecture diagram of an omnisource integrated system based on different flight stages provided by the present application. As shown in FIG. 1, the navigation sources of the omnisource navigation system include a satellite-based navigation system, a land-based navigation system, an inertial navigation system and a new generation aviation communication system, and when the target aircraft is in different flight stages, different navigation sources are combined for positioning. Through the optimization of the combination of omnisource systems, the combination of omnisource navigation systems satisfying the aviation operation performance is selected, and the navigation functions are allocated and interactively designed to ensure the overall performance and stability of the system.

Figure 2:
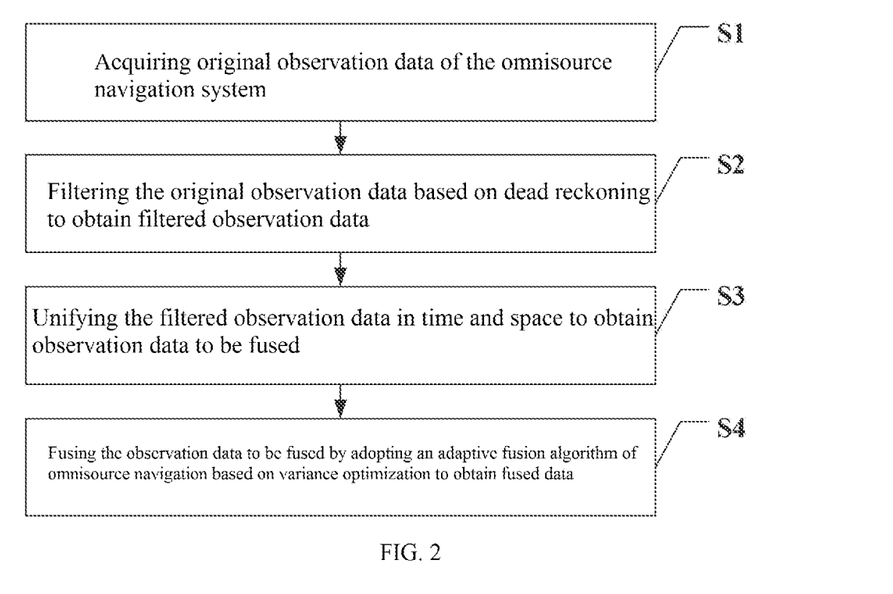
FIG. 2 is a flowchart of an airborne positioning method for an aviation navigation network provided by the present application.

FIG. 2 is a flowchart of an airborne positioning method for an aviation navigation network provided by the present application. As shown in FIG. 2, the airborne positioning method for an aviation navigation network includes:

S1, acquiring the original observation data of the omnisource navigation system;

S2, filtering the original observation data based on dead reckoning to obtain filtered observation data;

S3, unifying the filtered observation data in time and space to obtain observation data to be fused.

Specifically, in the data processing flow of omnisource source information fusion, the preprocessing module is used to evaluate the availability of the original observation data from omnisource source output. Because of the fragility of GNSS itself, the output data is easily affected by man-made and various interferences, resulting in high accuracy of the original observation information, but low reliability. Taking advantage of the high reliability and low accuracy of the output data of other navigation systems, the dead reckoning is used to judge whether the original observation data is credible. The unreliable data are filtered and rejected to improve the reliability of the observation data set. The module uses the unification of time and space to align the filtered observation data in time, so as to ensure that the data fusion has the same dimension and the same coordinate system. The main processing module and post-processing module are used for data fusion and integrity evaluation. In the data fusion part, the adaptive fusion algorithm of omnisource navigation based on variance optimization is adopted, and finally the fused data with high precision, high integrity and high reliability is output. Secondly, based on the established integrity evaluation model, the integrity of the omnisource fused data is monitored, and the monitoring results are fed back to the preprocessing stage to correct the reliability of the output data of the preprocessing module.

S4, fusing the observation data to be fused by adopting an adaptive fusion algorithm based on variance optimization to obtain fused data; the fused data is used to characterize the position of the target aircraft at the current moment.

Step S4 specifically includes:

S4.1, adaptively adjusting a measurement noise at a last moment according to a navigation source fusion factor at the last moment; wherein the navigation source fusion factor at the last moment is determined according to an error covariance matrix of a predicted state at the last moment;

Step S4.2, determining a Kalman filtering gain at the last moment according to the measurement noise at the last moment, the predicted state at the last moment and the error covariance matrix of the predicted state at the last moment;

Step S4.3, determining an estimated state of the last moment according to the Kalman filter gain, the predicted state and the measured value of the last moment;

Step S4.4, determining an error covariance matrix of the estimated state at the last moment according to the Kalman filter gain at the last moment, the predicted state at the last moment and the error covariance matrix of the predicted state at the last moment;

Step S4.5, determining a predicted state of a current moment according to a state transition matrix of the last moment and the estimated state of the last moment;

Step S4.6, determining an error covariance matrix of the predicted state at the current moment according to the state transition matrix at the last moment and the error covariance matrix of the estimated state at the last moment;

Step S4.7, determining the fused data at the current moment according to the error covariance matrix of the predicted state at the current moment and the observation data to be fused at the current moment.

Step S4.7 specifically includes:

Step S4.7.1, using a variance optimization method to determine the navigation source fusion factor at the current moment according to the error covariance matrix of the predicted state at the current moment; the calculation formula of the navigation source fusion factor is:

$$\omega_i = \frac{1}{\sigma_i^2 \sum_{j=1}^{n} \frac{1}{\sigma_j^2}};$$

where, $\omega_i$ is the fusion factor of an $i^{th}$ navigation source, n is a total number of navigation sources, $\sigma_i^2$, is the variance of the $i^{th}$ navigation source in the error covariance matrix of the predicted state, $\sigma_j^2$ is the variance of the $j^{th}$ navigation source in the error covariance matrix of the predicted state, and i and j are both the serial numbers of the navigation sources.

Step S4.7.2, determining the fused data at the current moment according to the navigation source fusion factor at the current moment and the observation data to be fused at the current moment; the calculation formula of the fused data at the current moment is:

$$\text{output} = \sum_{i=1}^{n} \frac{y_i}{\hat{\sigma}_i^2 \sum_{j=1}^{n} \frac{1}{\sigma_j^2}};$$

where, output is the fused data, $y_i$ is the observation data of the $i^{th}$ navigation source in the observation data to be fused, and $\hat{\sigma}_i^2$ is the estimated value of the variance of the $i^{th}$ navigation source in the error covariance matrix of the predicted state.

In the following, the above steps are explained in detail from five aspects: the design of adaptive Kalman filter, the optimization of omnisource navigation system, the calculation of optimal fusion factor, the variance estimation of omnisource navigation system and the verification of the rationality of variance estimation.

1. Design of Omnisource Adaptive Kalman Filter.

Figure 3:
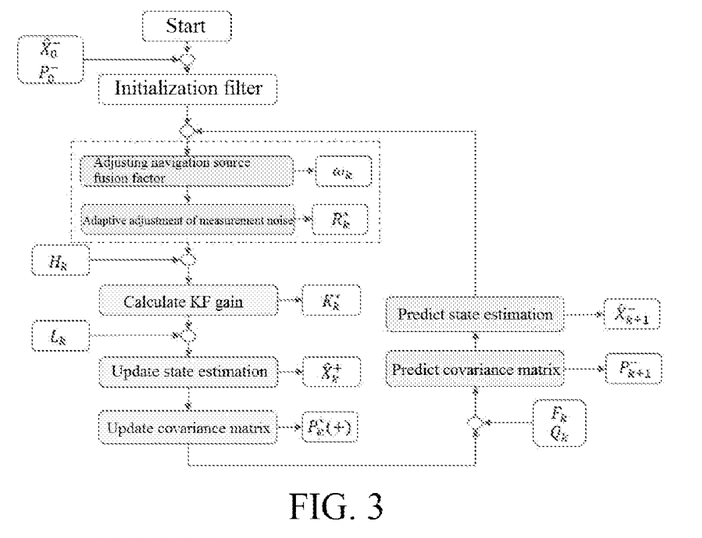
FIG. 3 is an algorithm flow chart of the omnisource adaptive Kalman filter provided by the present application.

Omnisource adaptive Kalman filter algorithm is a method to fuse the output results of multiple navigation sources, in which the weight of each navigation source is adaptively adjusted according to the quality of its output. FIG. 3 is the algorithm flow chart of the omnisource adaptive Kalman filter provided by the present application, and the formula and algorithm flow chart of the omnisource adaptive Kalman filter algorithm will be introduced with reference to FIG. 3.

It is assumed that the output results of a navigation source is $x_1, x_2, \ldots, x_n$, and the result of its Kalman filtering is $\hat{x}$, then the formula of adaptive multi-source Kalman filtering is:

$$\hat{x} = \sum_{i=1}^{n} \omega_i x_i \quad (1)$$

where, $\omega_i$ represents the weight of the $i^{th}$ navigation source (i.e., the fusion factor), $\hat{x}$ represents the Kalman filtering result of the $n^{th}$ navigation source. The weight $\omega_i$ of each navigation source is initialized, which can be given an initial value according to experience, for example $w_i=1/n$. After receiving the output $x_i$ of the omnisource navigation system every time, Kalman filtering is carried out to obtain the filtering result $\hat{x}$ and error covariance matrix $P_k$.

Predicting state: taking the moment k+1 as the current moment and the moment k as the last moment, at the moment k+1, the state estimation value and error covariance matrix at the current moment are predicted according to the state estimation value and state transition matrix at the moment k:

$$\hat{x}_{k+1}^- = F_k^{k+1} \hat{x}_k^+ \varepsilon_k \qquad (2)$$

$$P_{k+1}^- = F_k^{k+1} P_k^+ F_k^{k+1T} + Q_k^{k+1} \qquad (3)$$

where, $\hat{x}_{k+1}^-$ represents the predicted value of the state, i.e., the predicted state at k+1, $\hat{x}_k^+$ represents the estimated state at k+1, $P_{k+1}^-$ represents the error covariance matrix of the predicted state at k+1, $P_k^+$ represents the error covariance matrix of the estimated state at k, $F_k^{k+1}$ represents the state transition matrix at k, $\varepsilon_k$ represents the process noise at k, $Q_k^{k+1}$ represents the process noise covariance matrix at k, and the upper corner T represents transposition.

The Kalman gain is calculated according to the omnisource information: at the $k^{th}$ moment, the Kalman gain of the omnisource navigation system is calculated according to the covariance matrix of the predicted state and the measurement equation;

$$K_k = P_k^- H(\hat{x}_k^-)(H(\hat{x}_k^-)P_k^- H(\hat{x}_k^-)^T + R_k)^{-1} \qquad (4)$$

where $K_k$ represents the Kalman gain at time k, H is the measurement matrix and $R_k$ represents the measurement noise covariance matrix at time k.

The estimated value of the state is updated: at the $k^{th}$ moment, the estimated value of the state is updated by using the measured value and the Kalman gain;

$$x_k^+ x_k^- K_k(z_k - h(\hat{x}_k^-)) \qquad (5)$$

where $z_k$ represents the measured value at time k, $x_k^+$ is the estimated value of the updated state at time k, $x_k^-$ is the estimated value of predicted state at time k, and $h(\hat{x}_k^-)$ represents the observation model of state estimation at time k, which is also called observation function or measurement function.

The covariance matrix is updated: at the $k^{th}$ moment, the covariance matrix of the state is updated by using the Kalman gain and the predicted covariance matrix;

$$P_k^+ = (I - K_k h(\hat{x}_k^-)) P_k^- \qquad (6)$$

Where I is an identity matrix, and $P_k^+$ represents the error covariance matrix of the estimated state at time k.

Finally, the fused positioning solution is obtained by omnisource adaptive Kalman filter. At this time, the navigation source fusion factor in the omnisource adaptive Kalman filter is given by the following steps. When the navigation source fusion factor $\omega_k$ (composed of the weights $\omega_i$ of all navigation sources, i=1, 2, ..., n) is obtained, the measurement noise is adaptively adjusted, and the expression of $R_k^*$ at this time is:

$$R_k^* = (I - \omega_k) R_{(k-1)}^* + \omega_k (y_k y_k^T - H_k P_k H_k^T) \qquad (7)$$

wherein, $R(k_{-1}^*)$ represents the noise covariance matrix of the last moment, $\omega_k$ represents the navigation source fusion factor and $y^k$ represents the measured value of the current moment.

At this time, the filter gain is modified as follows:

$$K_k^* = P_k^- H(\hat{x}_k^-)(H(\hat{x}_k^-)P_k^- H(\hat{x}_k^-)^T + R_k^*)^{-1} \qquad (8)$$

According to the new filter gain matrix $K_k^*$, the updated measurement values and the corresponding covariance matrix can be obtained by substituting into equations (5) and (6).

II. Optimization of the Omnisource Navigation System

The measurement variance of the omnisource navigation system is estimated in real time and the fusion factor of the data source corresponding to each navigation source is adjusted. The fusion factor is multiplied by the output data of the corresponding navigation sources, and then the calculated results are summed to obtain the fusion result with the smallest mean square error as possible. The purpose is to improve the accuracy and reliability of the fused data and realize the optimal data fusion.

Figure 4:
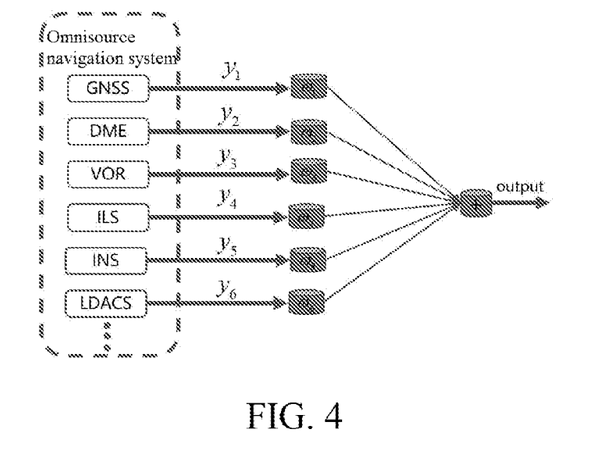
FIG. 4 is a schematic diagram of the fusion algorithm model provided by the present application.

FIG. 4 is a schematic diagram of the fusion algorithm model provided by the present application. As shown in FIG. 4, the output of the fusion algorithm model can be written as:

$$\text{output} = \sum_{i=1}^{n} \omega_i y_i \qquad (9)$$

where, $y_1$, $y_2$, L, $y_n$ is the observation value of a certain state parameter by n navigation sources, $\omega_1$, $\omega_2$, L, $\omega_n$ represents the fusion factor of the omnisource navigation system, that is, the weights of the $1^{st}$ to nth navigation sources.

According to the basic concept of fusion and the fusion algorithm model, the fusion result is determined by the value of fusion factor and the measurement parameters of the omnisource navigation system. The system determines the reliability and accuracy of the measured data, so the performance of the fusion algorithm depends largely on the value of the fusion factor. In a good fusion method, the proportion of measurement data in the fusion result is adjusted by calculating the fusion factor in real time, and determining the optimal fusion factor is the key of this method.

In order to obtain the optimal fusion factor of omnisource navigation system, the variance of each navigation source must be calculated. Whether the variance of the omnisource navigation system can be accurately obtained is directly related to the final fusion result. Therefore, it is necessary to deduce the calculation formula of fusion factor in order to obtain a reasonable fusion factor and improve the reliability and accuracy of fusion results.

III. Calculation of an Optimal Fusion Factor

Assuming that the state parameters and observation equations of a system's omnisource navigation system are as follows:

$$Y = Hx + e \qquad (10)$$

wherein, x represents a one-dimensional state vector, and H is a n-dimensional constant vector. $Y = [y_1, y_2, L, y^n]$ is a n-dimensional measure. $y_1, y_2, L, y_n$ are independent of each other and are unbiased estimates of x. $e = [e_1, e_2, L, e_n]^T$ is a n-dimensional measurement noise vector.

It is assumed that the observed noise is zero mean white noise, and the noise components are independent of each other under normal distribution. Then:

$$E[e_i] = 0 (i=1,2,\ldots,n) \qquad (11)$$

$$D[e_i] = E[(x - y_i)^2] = \sigma_i^2 (i=1,\ldots,n) \qquad (12)$$

where, $\sigma_i^2 (i=1,\ldots,n)$ is the $i^{th}$ omnisource observation variance. E represents the expected variance operator and D represents the standard deviation operator. The population variance $\sigma^2$ after fusion can be expressed as:

$$\sigma^2 = E[(x - \text{output})^2] = E\left[\left(\sum_{i=1}^{n}\omega_i x - \sum_{i=1}^{n}\omega_i y_i\right)^2\right] = \quad (13)$$

$$E\left[\sum_{i=1}^{n}\omega_i^2 (x-y_i)^2 + 2\sum_{i=1,j=1,i\neq j}^{n}\omega_i \omega_j (x-x_i)(y-y_j)\right]$$

$$E(x-x_i)(y-y_i)=0(i=1,2,L,n,j=1,2,L,n,i\neq j) \quad (14)$$

Therefore $\sigma^2$ can be expressed as:

$$\sigma^2 = E\left[\sum_{i=1}^{n}\omega_i^2 (x-y_i)^2\right] = \sum_{i=1}^{n}\omega_i^2 \sigma_i^2 \quad (15)$$

It can be seen from the above formula that the population variance $\sigma^2$ after fusion is a multivariate quadratic function related to each fusion factor, therefore $\sigma^2$ must have a minimum value. When the fusion factor $\omega_1, \omega_2, L, \omega_n$ satisfies the constraint conditions, the minimum value is the extreme value of multivariate function. According to the theory of multivariate optimization, the minimum value of $\sigma^2$ exists as follows:

$$\sigma^2_{min} = \min\left(\sum_{i=1}^{n}\omega_i^2 \sigma_i^2\right) = \frac{1}{\sum_{i=1}^{n}\frac{1}{\sigma_i^2}} \quad (16)$$

When the population variance $\sigma^2$ is minimum, the optimal fusion factor of the omnisource navigation system is:

$$\omega_i = \frac{1}{\sigma_i^2 \sum_{j=1}^{n}\frac{1}{\sigma_j^2}} \quad (17)$$

4. Variance Estimation of the Omnisource Navigation System

In order to get the optimal fusion factor of each navigation source, the variance of each navigation source must be calculated. It is worth noting that the estimation accuracy of the variance of the omnisource system directly affects the fusion result.

The average value of omnisource source measurement is:

$$\bar{y} = \frac{1}{n}\sum_{i=1}^{n}y_i \quad (18)$$

Therefore:

$$E[\bar{y}] = E\left[\frac{1}{n}\sum_{i=1}^{n}y_i\right] = x \quad (19)$$

The above formula indicates $\bar{y}$ is he unbiased estimation of x. The variance of the $j^{th}$ omnisource source measurement can be obtained from Equation (12) as follows:

$$1=D(y_j-x)=E(y_j-x)^2, j=1,2,L,n \quad (20)$$

If an unbiased estimate of the true value is used instead of the true value of the state, then:

$$(\sigma_j')^2 = D(y_j - \bar{y}) = D\left[\left(y_j - \frac{1}{n}\sum_{i=1}^{n}y_i\right)\right] = \frac{(n-1)^2}{n^2}\sigma_j^2 + \frac{1}{n^2}\sum_{i=1,i\neq j}\sigma_i^2, \quad (21)$$

$$j=1,2,s,n,$$

where, $\sigma_j'$ is the difference between the variance of the $j^{th}$ omnisource measurement and n omnisource measurements, and $\sigma_j'(j=1,2,L,n)$ are summed to obtain:

$$\sum_{j=1}^{n}(\sigma_j')^2 = \frac{n-1}{n}\sum_{j=1}^{n}\sigma_j^2 \quad (22)$$

According to the above two formulas, the measurement variance of the $j^{th}$ omnisource source is:

$$(\sigma_j')^2 = \frac{n}{n-2}\left[(\sigma_j')^2 - \frac{1}{n(n-1)}\sum_{i=1}^{n}(\sigma_j')^2\right] \quad (23)$$

Next, n navigation sources measures the parameters to be measured for n times, $y_{ij}$, indicates the $i^{th}$ measurement of the $j^{th}$ omnisource source. The estimated value of $(\sigma_j')^2$ obtained from the above formula is:

$$(\hat{\sigma}_j')^2 = \frac{1}{N}\sum_{i=1}^{N}(y_{ij} - \bar{y}_i)^2 \quad (24)$$

The $j^{th}$ omnisource variance can be obtained from the above formula:

$$(\hat{\sigma}_j')^2 = \frac{n}{n-2}\left[(\hat{\sigma}_j')^2 - \frac{1}{n(n-1)}\sum_{i=1}^{n}(\hat{\sigma}_i')^2\right] \quad (25)$$

V. Verification of the rationality of variance estimation.

In the above steps, the variance estimation value of the omnisource navigation system is obtained, and the rationality of the variance estimation of the omnisource navigation system must be verified. Therefore, the statistical properties of variance estimation of omnisource navigation system are discussed. As shown in Formula (25), the estimation of $(\hat{\sigma}_j')^2$ can be expressed as:

$$(\hat{\sigma}_j')^2 = \frac{1}{N}\sum_{i=1}^{N}(y_{ij} - \bar{y}_i)^2 = \frac{1}{N}\sum_{i=1}^{N}(d_{ij} - \bar{d}_i)^2 = \frac{1}{N}\sum_{i=1}^{N}(d_{ij}')^2 \quad (26)$$

where, $d_{ij}$ represents the deviation of the $i^{th}$ measurement of the $j^{th}$ navigation source and $\bar{d}$ is the average deviation of the $i^{th}$ measurement.

$$d_{ij}'=d_{ij}-\bar{d} \quad (27)$$

If the random variable X obeys the $\Gamma$ distribution of parameters T and U it is recorded as X: $\Gamma(T,U)$ $d_{ij}'$ is a linear combination of $d_{ij}$ (j=1,2,L,n) so $d_{ij}'$ still obeys the normal distribution, which can be deduced as the following formula:

$$(d_{ij}')^2 \sim \Gamma\left(\frac{1}{2}, \frac{1}{2(\sigma_j')^2}\right) \tag{28}$$

The addition of $\Gamma$ distributions can be introduced as follows:

$$(\hat{\sigma}_j)' = \frac{1}{N}\left(\sum_{i=1}^{N} d_{ij}'\right)^2 \sim \Gamma\left(\frac{N}{2}, \frac{N}{2(\sigma_j')^2}\right) \tag{29}$$

According to the nature of $\Gamma$ distribution, the following can be obtained:

$$D[(\hat{\sigma}_j)'] = \frac{T}{U^2} = \frac{2(\sigma_j')^4}{N} \tag{30}$$

It can be seen from Equation (30) that the variance of the estimated value decreases with the increase of the number of samples. Therefore, using variance optimization model to estimate the variance of omnisource source measurement in real time can improve the accuracy of estimation. Based on the above derivation and analysis, the fusion output based on variance optimization is:

$$\text{output} = \sum_{i=1}^{n} \frac{y_i}{\hat{\sigma}_i^2 \sum_{j=1}^{n} \frac{1}{\sigma_j^2}} \tag{31}$$

wherein:

$$\hat{\sigma}_i^2 = \frac{n}{n-2}\left[(\hat{\sigma}_i')^2 - \frac{1}{n(n-1)}\sum_{j=1}^{n}(\hat{\sigma}_j')^2\right] \tag{32}$$

In this case, $y_i$ is the output of the single epoch (single moment) of the $i^{th}$ navigation source, $\hat{\sigma}_i^2$ is the variance estimation value of the $i^{th}$ navigation source, and $\hat{\sigma}_i'$ is the variance estimation of the difference between the single epoch measurement value of the $i^{th}$ navigation source and the average measurement value of n navigation sources.

Further, the airborne positioning method for an aviation navigation network further comprises:
monitoring the data integrity of the fused data to obtain a monitoring result; using the monitoring result to optimize the steps of filtering the original observation data based on dead reckoning to obtain filtered observation data and unifying the filtered observation data in time and space to obtain observation data to be fused.

To sum up, the adaptive Kalman filtering algorithm adopted by the present application can estimate and optimize the measurement variance of the omnisource navigation system in real time, thereby generating the optimal fusion factor for each navigation source and improving the performance and reliability of the whole navigation system. The variance optimization model adopted by the present application can estimate the measurement variance of the omnisource navigation system in the subsequent time step, thereby obtaining an estimated value close to the true value, and improving the accuracy and stability of the fusion factor. The omnisource adaptive Kalman filtering algorithm provided by the present application dynamically adjusts the weight of each navigation source according to the error covariance matrix output by the Kalman filter, thus ensuring the reliability of the positioning result. The adaptive switching mechanism adopted by the present application can realize the adaptive selection and switching of each navigation system, and the omnisource source system can be inserted or withdrawn from the positioning solution, thus ensuring the availability and reliability of the navigation system in different situations.

Example 2

In order to implement the method corresponding to Example 1 above, so as to realize the corresponding functions and technical effects, an airborne positioning system for an aviation navigation network is provided below, which is applied to an omnisource navigation system; the navigation sources of the omnisource navigation system include a satellite-based navigation system, a land-based navigation system, an inertial navigation system and a new generation aviation communication system, and when the target aircraft is in different flight stages, different navigation sources are combined for positioning; The airborne positioning system for an aviation navigation network comprises:
a data acquisition module configured for acquiring original observation data of the omnisource navigation system;
a preprocessing module configured for:
filtering the original observation data based on dead reckoning to obtain filtered observation data;
unifying the filtered observation data in time and space to obtain observation data to be fused;
a main processing module configured for:
fusing the observation data to be fused by adopting an adaptive fusion algorithm of omnisource navigation based on variance optimization to obtain fused data; wherein the fused data is used to characterize a position of the target aircraft at a current moment.
Further, the airborne positioning system for an aviation navigation network further comprises:
a post-processing module is configured for monitoring the data integrity of the fused data to obtain a monitoring result; using the monitoring result to optimize the step of filtering the original observation data based on dead reckoning to obtain filtered observation data and unifying the filtered observation data in time and space to obtain observation data to be fused.

To sum up, the present application is mainly realized by the following technical solution:
1. analyzing the positioning solutions of different navigation source combinations and the positioning modes of different navigation systems;
2. according to the different flight stages of the route operation, dividing omnisource navigation system, and using the advantages of different navigation systems to optimize the selection and fusion positioning;
3. establishing an omnisource integrated system architecture based on the whole airspace in different flight stages;

4. deriving the fusion factor calculation formula to obtain a reasonable fusion factor to improve the reliability and accuracy of fusion results;
5. initializing the weight of each navigation source, attaching the initial value according to the experience and substituting it into the adaptive Kalman filter;
6. according to the error covariance matrix of Kalman filter, dynamically adjusting the weight of each navigation source, so that the weight is inversely proportional to the error covariance, making the fusion result more accurate and reliable;
7. estimating the measurement variance of the omnisource navigation system, adjusting the fusion factor of the data source corresponding to each navigation source, and optimizing the combination of different navigation sources;
8. verifying the rationality of the variance estimation of the omnisource navigation system, and discussing he statistical properties of the variance estimation of the omnisource navigation system.

The technical solution has the following beneficial effects:
1. The present application proposes an omnisource integrated system architecture, which can help realize the minimum operation network of future aviation navigation and positioning, and provides an effective way to improve the reliability of the system while ensuring the positioning accuracy.
2. By adaptively adjusting the used navigation source, the present application helps to solve the aviation safety hidden trouble and efficiency degradation problems caused by frequent interference of aviation radio navigation signals, and improves the safety and efficiency of the navigation system.
3. The present application solves the interference monitoring and defense technology of aviation radio navigation system in the whole airspace by using different types of navigation sources in the whole flight stage. At the same time, it solves the problem that the PBN service area is limited by using a single land-based navigation system, and improves the navigation and positioning performance of aviation navigation in the whole flight stage.
4. The present application can provide a complete performance-based navigation service in the absence of global satellite navigation system GNSS.
5. The present application can provide backup information sources in the case of airborne equipment failure or data loss through the omnisource information fusion technology, thereby reducing flight risks and increasing airborne safety.
6. Based on multiple data sources, the present application can better detect and correct data anomalies and errors by using the omnisource information fusion technology, thus improving the fault tolerance and stability of the system.
7. By integrating various data sources, including different types of satellite navigation systems, ground measurement equipment, inertial measurement equipment, etc., the present application can provide more flexibility and adaptability to adapt to different navigation scenarios and requirements.
8. The present application can effectively improve the economic benefits of aviation navigation. By improving the accuracy and safety of an aviation navigation positioning system, the cost of airlines can be reduced, the number of flight delays and cancellations can be reduced, and the efficiency and operational benefits of flights can be improved.
9. By adopting the system-level modular design, the whole navigation system has strong expansibility and maintainability, and can adapt to different types of aircrafts and different airborne equipment.
10. The present application provides a GNSS-based PBN terminal operation solution, which can meet the terminal operation requirements and improve the usability and reliability of the navigation system.

Each embodiment in this specification is described in a progressive way, and each embodiment focuses on the differences from other embodiments, so it is only necessary to refer to the same and similar parts between each embodiment. As for the system disclosed in the embodiment, because it corresponds to the method disclosed in the embodiment, the description is relatively simple, and the relevant points can only be described in the method part.

In this paper, specific examples are used to explain the principle and implementation of the present application, and the description of the above embodiments is only used to help understand the method and its core idea of the present application; at the same time, for those skilled in the art, according to the idea of the present application, there will be changes in the specific implementation and application scope. In summary, the contents of this specification should not be construed as limiting the present application.

What is claimed is:
1. An airborne positioning method for an aviation navigation network, wherein the airborne positioning method for an aviation navigation network is applied to an omnisource navigation system; navigation sources of the omnisource navigation system comprise a satellite-based navigation system, a land-based navigation system, an inertial navigation system and an aviation communication system, and when a target aircraft is in different flight stages, different navigation sources are combined for positioning; the airborne positioning method for an aviation navigation network comprises the following steps:
acquiring original observation data of the omnisource navigation system;
filtering the original observation data based on dead reckoning to obtain filtered observation data;
unifying the filtered observation data in time and space to obtain observation data to be fused;
fusing the observation data to be fused by adopting an adaptive fusion algorithm of omnisource navigation based on variance optimization to obtain fused data; wherein the fused data is used to characterize a position of the target aircraft at a current moment.

2. The airborne positioning method for an aviation navigation network according to claim 1, wherein the step of fusing the observation data to be fused by adopting an adaptive fusion algorithm of omnisource navigation based on variance optimization to obtain fused data specifically comprises:
adaptively adjusting a measurement noise at a last moment according to a navigation source fusion factor at the last moment; wherein the navigation source fusion factor at the last moment is determined according to an error covariance matrix of a predicted state at the last moment;
determining a Kalman filtering gain at the last moment according to the measurement noise at the last moment, the predicted state at the last moment and the error covariance matrix of the predicted state at the last moment;

determining an estimated state of the last moment according to the Kalman filter gain, the predicted state and the measured value of the last moment;

determining an error covariance matrix of the estimated state at the last moment according to the Kalman filter gain at the last moment, the predicted state at the last moment and the error covariance matrix of the predicted state at the last moment;

determining a predicted state of a current moment according to a state transition matrix of the last moment and the estimated state of the last moment;

determining an error covariance matrix of the predicted state at the current moment according to the state transition matrix at the last moment and the error covariance matrix of the estimated state at the last moment;

determining the fused data at the current moment according to the error covariance matrix of the predicted state at the current moment and the observation data to be fused at the current moment.

3. The airborne positioning method for an aviation navigation network according to claim 2, wherein the step of determining the fused data at the current moment according to the error covariance matrix of the predicted state at the current moment and the observation data to be fused at the current moment specifically comprising:

determining a navigation source fusion factor at the current moment according to the error covariance matrix of the predicted state at the current moment by adopting a variance optimization method;

determining the fused data at the current moment according to the navigation source fusion factor at the current moment and the observation data to be fused at the current moment.

4. The airborne positioning method for an aviation navigation network according to claim 3, wherein a calculation formula of the navigation source fusion factor is:

$$\omega_i = \frac{1}{\sigma_i^2 \sum_{j=1}^{n} \frac{1}{\sigma_j^2}};$$

where, $\omega_i$ is the fusion factor of an $i^{th}$ navigation source, n is a total number of navigation sources, $\sigma_i^2$ is the variance of the $i^{th}$ navigation source in the error covariance matrix of the predicted state, $\sigma_j^2$, is the variance of the $j^{th}$ navigation source in the error covariance matrix of the predicted state, and i and j are both the serial numbers of the navigation sources.

5. The airborne positioning method for an aviation navigation network according to claim 4, wherein a calculation formula of the fused data at the current moment is:

$$\text{output} = \sum_{i=1}^{n} \frac{y_i}{\hat{\sigma}_i^2 \sum_{j=1}^{n} \frac{1}{\sigma_j^2}};$$

where, output is the fused data, $y_i$ is the observation data of the $i^{th}$ navigation source in the observation data to be fused, and $\hat{\sigma}_i^2$ is the estimated value of the variance of the $i^{th}$ navigation source in the error covariance matrix of the predicted state.

6. The airborne positioning method for an aviation navigation network according to claim 1, further comprising:

monitoring the data integrity of the fused data to obtain a monitoring result; using the monitoring result to optimize the step of filtering the original observation data based on dead reckoning to obtain filtered observation data and unifying the filtered observation data in time and space to obtain observation data to be fused.

7. An airborne positioning system for an aviation navigation network, wherein the airborne positioning system for an aviation navigation network is applied to an omnisource navigation system; navigation sources of the omnisource navigation system comprise a satellite-based navigation system, a land-based navigation system, an inertial navigation system and an aviation communication system, and when a target aircraft is in different flight stages, different navigation sources are combined for positioning; the airborne positioning system for an aviation navigation network comprises:

a data acquisition module configured for acquiring original observation data of the omnisource navigation system;

a preprocessing module configured for:
filtering the original observation data based on dead reckoning to obtain filtered observation data;
unifying the filtered observation data in time and space to obtain observation data to be fused;

a main processing module configured for:
fusing the observation data to be fused by adopting an adaptive fusion algorithm of omnisource navigation based on variance optimization to obtain fused data; wherein the fused data is used to characterize a position of the target aircraft at a current moment.

8. The airborne positioning system for an aviation navigation network according to claim 7, further comprising:

a post-processing module is configured for monitoring the data integrity of the fused data to obtain a monitoring result; using the monitoring result to optimize the step of filtering the original observation data based on dead reckoning to obtain filtered observation data and unifying the filtered observation data in time and space to obtain observation data to be fused.

* * * * *